Sept. 25, 1962  F. A. MULLER ETAL  3,055,898
METHOD OF PREPARING AMINOTRIAZINES USEFUL
FOR TISSUE-EQUIVALENT PLASTIC COMPOSITION
Filed Oct. 30, 1953
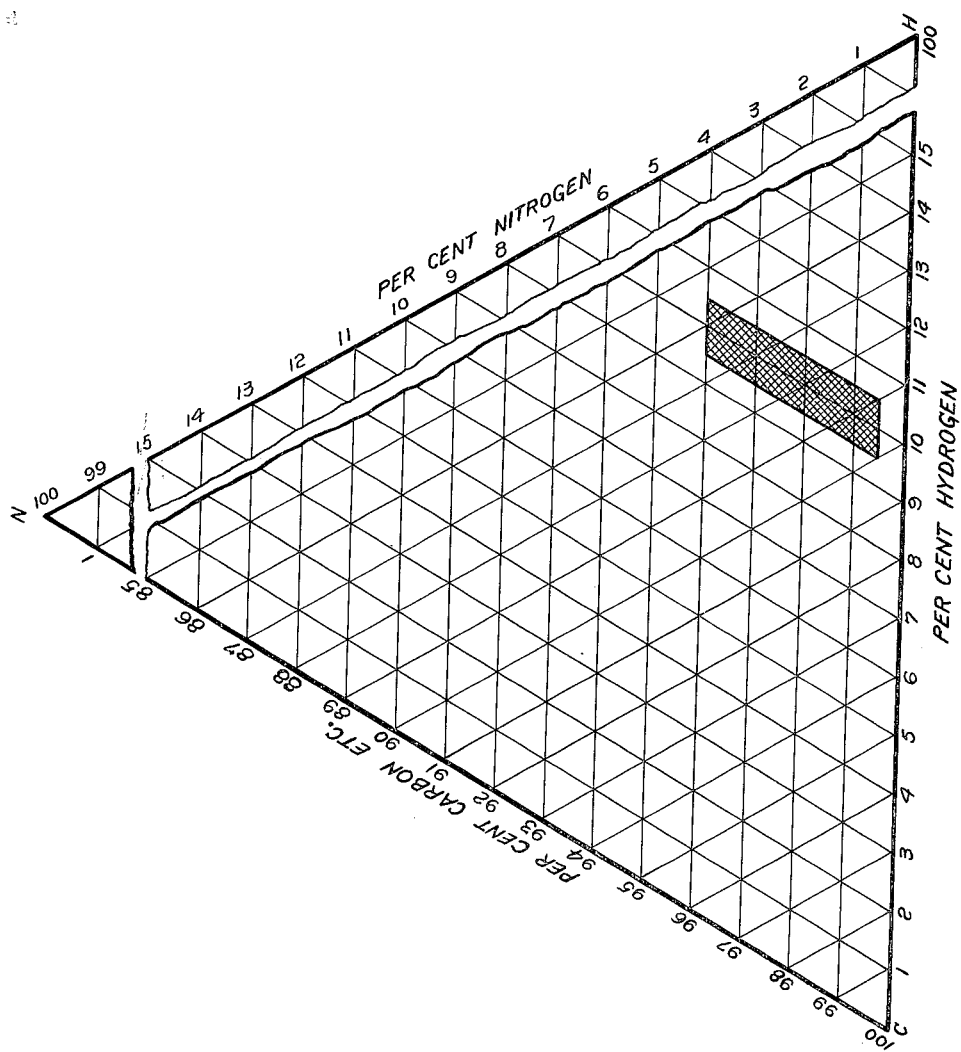
INVENTORS
FRED A. MULLER
DONALD K. KEEL
BY
ATTORNEY 3,055,898
METHOD OF PREPARING AMINOTRIAZINES USEFUL FOR TISSUE-EQUIVALENT PLASTIC COMPOSITION

Fred A. Muller, Pompton Plains, and Donald K. Keel, Cranford, N.J., assignors to International Telephone and Telegraph Corporation, Nutley, N.J., a corporation of Maryland
Filed Oct. 30, 1953, Ser. No. 389,344
1 Claim. (Cl. 260—249.8)

This invention relates to new chemical compounds and molding compositions and to methods for producing them. More specifically, this invention relates to new tissue-equivalent semiconducting molding compositions and materials molded therefrom for use in ionization chambers.

Radiation dosimetry, i.e., the detection and measurement of ionizing radiation, is assuming an ever-increasing role of importance, brought on by the rapidly expanding development and utilization for military, industrial and medical purposes of devices for producing ionizing radiations. These dosimeters for the detection and measurement of ionizing radiation are important not only potentially for assessing the devastating radioactivity that would follow atomic warfare, but currently for medical research in tracer studies with diagnostic and therapeutic agents. Thus, there are medical studies under way at present in various research institutes to determine the effects of ionizing radiation, particularly gamma and neutron radiation, on animal, including human, subjects with respect to length of life, tumor incidence, involution of lymphatic organs, fertility, cataract formation and other pathological and physiological effects. Furthermore, from a health and safety viewpoint, the detection and measurement of quantities of ionizing radiation is of considerably personal interest to radiologists and those engaged in the handling of radioactive substances.

For an accurate evaluation of the effects of radiation on living tissue, radiation-detection and measuring devices are required whose readings correlate with actual exposure effects on living tissue. Ideally, such instuments should be suitable for use with all types of ionizing radiation, particularly alpha particles, beta particles, X-rays, gamma rays, and fast and slow neutrons. For the purposes of this invention, we are principally concerned with the dosimetry of gamma and neutron radiation. Furthermore, consistency among the fundamental units used for measuring radiation effects is important for a proper correlation between instrumental values and actual tissue effects. At present a standard unit for measuring the effects of ionizing radiation upon living tissue has not been definitely established; thus, the question of a biological dose unit as a means of correlating radiation dosage and expected biological effect is still being currently discussed. However, for our purposes, the energy absorbed by the tissues exposed will be considered as the most suitable physical index of the biological effect of ionizing radiation. The unit of dose may be considered as an erg per gram of tissue or as the "roentgen equivalent physical" (rep.) which is now defined as the dose of any ionizing radiation that results in the absorption of 93 ergs per gram of tissue. Either unit is sufficiently established in this art to be used as a measure of the intensity of ionization upon animal tissue. The term "animal tissue" is used in a generic sense throughout this specification and includes human tissue.

Of the currently available instruments for use in radiation studies, the ionization chamber is considered the most suitable. Basically, all practical devices now in use for the measurement of radioactivity depend on the ability of the radiation to produce ionization in solids, liquids or gases. Since the physiological effects of radiation are believed to be essentially the result of ionization within the tissue, it is logical that the results of estimation of radiation by ionization methods should parallel these effects. Thus of the many studies made of the effects of X-rays, gamma rays, and neutrons on tissue, the results bear out roughly the supposition that the effect produced by the radiation is proportional to the ionization it produces in the part affected. It should, of course, be borne in mind that the two radiations most effective in producing useful biological reactions, hard electromagnetic radiation and neutrons, do not, themselves, produce any effects at all—their action is entirely by virtue of the action of charged particles which they produce as secondary products. The neutrons produce heavy charged particles which produce short, intense paths of ionization as secondaries, whereas gamma radiation produces electrons as secondaries which cause a less dense ionization over a much greater volume.

While photographic methods and crystal counters, such as diamond and zinc sulfide, have been used to measure radiation effects, an ionization chamber must be used where accurate estimations of either large or small amounts of ionizing radiations are to be made. The simplest type of ionization chamber consists of a gas-filled container with a wall of conducting material and a central electrode of conducting material, both highly insulated from each other. The operation of these chambers is well-known to those working in this field and basically depends upon the ionization of a gas molecule in the chamber by a photon of radiant energy. A potential difference is maintained between the electrodes so that the gas ions formed are collected on the electrodes and recombination is not permitted to occur. All simple ionization chambers work on this basic principle although many elaborate variations have been made. Thus, where gamma rays and cosmic rays of high energy are to be measured, large chambers with high gas pressures are used. On the other hand, tiny chambers of a few millimeters in diameter have been used to measure radiations in tissue.

A large variety of instruments have been used to measure the ions collected in these chambers. These include various types such as electrometers, vacuum-tube amplifiers, galvanometers and the like. Although other devices such as Geiger counters and proportional counters are also employed for detecting and measuring ionizing radiation, for the purposes of this invention they will be considered as only more elaborate varieties of ionization chambers.

In preparing an ionization chamber whose dosimetry shall approximate that of animal tissue, several chemical and electrical considerations must be borne in mind in addition to the usual structural considerations. Thus, in the construction of the ionization chamber, design factors with respect to wall thickness, size of confined gas volume, and directional effects must be determined. But, it is basically desired to have both the outside electrode, the central electrode and the contained gas tissue-equivalent with respect to the ionizing radiation, and particularly with respect to gamma and neutron radiation. One proposed method is to have the gas and both electrodes made of material whose chemical composition, insofar as possible, simulates that of animal tissue, particularly with respect to those chemical elements whose instrumental behavior is considered critical when irradiated by gamma rays and neutrons.

Many problems must be overcome in developing a suitable material, for use in ionization chambers, that is tissue-equivalent. Thus an analysis of wet animal tissue shows that, on an average basis, 99 percent by weight of tissue is made up of hydrogen, carbon, nitrogen and oxygen. Carbon is present in approximately 12 percent by weight, nitrogen 4 percent, oxygen 73 percent and hydrogen 10 percent, with the balance consisting of various metallic and non-metallic elements present in minor and trace proportions. In most calculations dealing with the effect of ionizing radiation on the cross section of these elements, the effect upon hydrogen of gamma radiation but not of neutron radiation is usually ignored because it is considered that for gamma radiation there is no nuclear absorption occurring in hydrogen; the effects upon carbon and oxygen for both types of radiation are considered as substantially equivalent. While, theoretically, many formulations may be proposed as yielding on an empirical basis the desired proportions of carbon, nitrogen, hydrogen and oxygen for forming the electrode materials, other requirements impose severe limitations. Thus, the wall and inner electrode must be conductive, having a maximum volume resistivity of $10^5$ ohm-centimeters. It is also considered highly desirable and important for obtaining consistent and reproducible measurements that the wall material used be homogeneous in composition to such an extent that any granular structures present of different atomic composition have diameters of less than 1 micron. The composition used, furthermore, must be readily moldable by conventional compression- or injection-molding techniques to form this homogeneous electrode material. Furthermose, the percentage of hydrogen and nitrogen present in such a wall material must remain constant within one percent for at least a period of a year. In addition, the material used must be non-permeable to the gas used in the interior of the chamber to an extent that a leakage of less than 5 percent of the gas occurs during a period of a year. It is apparent, therefore, that these conditions impose severe limitations on the development of suitable tissue-equivalent materials for use in ionization chambers. Although several chambers have been described heretofore using electrodes having hydrogen and carbon in relative proportions equivalent to animal tissue, to our knowledge none of these have been completely successful for their purpose of approximating radiation effects on animal tissue or have satisfactorily met the above-stated requirements. None of these chambers to our knowledge have ever been built utilizing as wall or electrode material a tissue-equivalent material equivalent with respect to the nitrogen content of animal tissue.

Accordingly, it is a principal object of this invention to provide a moldable tissue-equivalent material for use in preparing electrodes for an ionization chamber, this material having an atomic composition so that when irradiated by neutrons and gamma rays it responds in a manner corresponding substantially to the response of animal tissue to such irradiation.

It is a further object to provide a conducting material which is homogeneous and whose atomic composition is equivalent to that of animal tissue with respect to the nitrogen, hydrogen and combined carbon and oxygen content thereof.

It is yet an additional object to provide a tissue-equivalent material including a chlorine content.

It is yet a further object to provide a method for preparing this tissue-equivalent wall material, for use in ionization chambers, having a volume resistivity less than $10^5$ ohm-centimeters.

It is still a further object to provide new chemical compounds and processes for preparing these compounds to be used as nitrogen-supplying constituents of the tissue-equivalent material.

It is a feature of this invention that the moldable tissue-equivalent material is composed of a chemical compound selected from the group consisting of 2,4-di-n-butylamino-6-hydroxy-s-triazine and 2,4-di-n-butylamino-6-chloro-s-triazine admixed with polyethylene and/or polyisobutylene together with finely divided carbon, preferably in the form of acetylene black.

For an understanding of the preferred proportions of the tissue-equivalent molding composition, reference is made to the single FIGURE of the drawing in which a triangular-coordinate scale has been used to represent the relative proportions present in the tissue-equivalent material of hydrogen, nitrogen and the balance consisting of carbon and oxygen.

By reference to the figure, it is seen that the percentage of hydrogen present may vary from 9.5 to 10.5% by weight, the percentage of nitrogen present may vary from 0.5 to 4% and the balance to total 100% may consist principally of carbon, although also including oxygen and minor amounts of other elements. For certain purposes an amount of chlorine equivalent to that present in human tissue may also be incorporated in the mixture. While carbon and oxygen may be present in any relative proportions, elements other than nitrogen and hydrogen should not exceed one percent by weight of the total composition. Also, these trace elements must be such as to contribute no more than one percent to the total ionization upon exposure of the chamber to neutrons.

The atomic composition of the gas used within the ionization chamber is also tissue-equivalent and of substantially the same proportions as the wall material and subject to the same impurity limitations. While the hydrogen and nitrogen content should be approximately equal to the corresponding percentages in the wall material, the ratio of carbon to oxygen may differ in the gas compared with the wall. A gas mixture having the desired atomic composition may be readily prepared by utilizing non-reacting proportions of methane, carbon dioxide and nitrogen and possibly hydrogen and oxygen. Where a chlorine content is desired for the gas, carbon tetrachloride, chloroform or some similar material may be incorporated in the gas mixture. It will be readily apparent that other gases may also be utilized subject of course to their stability with respect to time and with respect to radiation exposure.

The nitrogen required for the electrode material is principally supplied by 2,4-di-n-butylamino-6-hydroxy-s-triazine, although 2,4-di-n-butylamino-6-chloro-s-triazine may be added in an amount to supply the desired proportion of chlorine, and thus also supply an additional quantity of nitrogen. The 2,4-di-n-butylamino-6-hydroxy-s-triazine and/or 2,4,-di-n-butylamino-6-chloro-s-triazine compound also supply part of the hydrogen requirements. The balance of the hydrogen is supplied by the addition of polyethylene. We have found that replacement of a small part of the polyethylene by polyisobutylene on an equal weight for weight basis generally promotes moldability of the compound. Carbon is supplied in the form of a finely divided graphite, commercially available as acetylene black.

While several conductive plastic compositions are known, their utility as tissue-equivalent materials is subject to all the restrictions previously indicated. Thus, we have found that while many substituted triazine compounds are theoretically suitable for yielding the desired proportions of nitrogen, only a few members of this group may be successfully used. We have found, for example, that the substituted melamine compound hexadecylmelamine is unsatisfactory for use in a tissue-equivalent molding composition because of the fact that with time it tends to become unstable and exude to the surface of the electrode wall. Effectively this tends to offer a much higher cross section of nitrogen to ionizing radiation. Other substituted triazines evaluated have proven unsatisfactory either on a basis of incompatibility with the other ingredients, poor moldability, poor physical properties or excessive permeability to the contained gases. Melamine, for example, is insufficiently compatible with polyethylene. We have discovered, however, that two hitherto unknown substituted triazines which we have prepared, namely, 2,4-di-n-butylamino-6-hydroxy-s-triazine and 2,4-di-n-butylamino-6-chloro-s-triazine are ideally suited for incorporation in a tissue-equivalent molding formulation. These compounds alone or in combination may be incorporated in a polyethylene-polyisobutylene mixture together with carbon, and in the desired proportions to give an atomic composition that is tissue-equivalent. Essentially, a molding compound is desired having a content in percentage by weight of nitrogen between 0.5 and 4%, hydrogen between 9.5 and 10.5% and the balance consisting substantially of carbon and oxygen in any relative proportions. In order to have electrodes that are conductive, the amount of carbon incorporated in relation to the oxygen present is considerably in excess of that found in animal tissue. This is necessary in order that the electrodes have a maximum resistivity not in excess of $10^5$ ohm-centimeters. However, it has been found that the relative proportions of carbon and oxygen present may be varied without affecting the tissue-equivalence of the mixture of which they are constituents.

For purposes of illustrations of several tissue-equivalent formulations without in any sense being limited thereto, the following formulations may be prepared:

*Example 1*

| | Percent by weight |
|---|---|
| 2,4-di-n-butylamino-6-hydroxy-s-triazine | 1.5 to 14 |
| Polyethylene, Bakelite DE-3401 | 52 to 72 |
| Polyisobutylene, Vistanex B-40 | 0 to 5 |
| Carbon, Shawinigan acetylene black | 20 to 35 |

*Example 2*

| | |
|---|---|
| 2,4-di-n-butylamino-6-chloro-s-triazine | 1.5 to 14.5 |
| Polyethylene | 58 to 72 |
| Carbon | 20 to 35 |

*Example 3*

| | |
|---|---|
| 2,4-di-n-butylamino-6-hydroxy-s-triazine | 13.7 |
| Polyethylene | 57.8 |
| Carbon | 27.5 |

Proportions of nitrogen present may be varied depending upon the type of tissue simulated: where a muscle tissue-equivalent composition is desired, the nitrogen content is made high, while for a fat tissue-equivalent composition the nitrogen content is low. While the formulation may be prepared without polyisobutylene, we have found that its presence promotes the chemical stability of the composition as well as imparting a certain small degree of ease in molding, as well as flexibility of the molded product.

It has been found that the various steps used in preparing the formulation as well as their relative sequence one to the other are important for obtaining the desired electrical and physical characteristics. Thus proper incorporation of the carbon is important to obtain the desired electrical conductivity. Overmixing of the carbon in the formulation has been found to increase the resistivity beyond a usable value. It is considered that the carbon is present in a network chain and that overmixing destroys this network chain and thereby increases the volume resistivity.

As an example of the process of preparing the formulation, the following is a typical procedure used. A weighed amount of polyethylene together with polyisobutylene was introduced in a Banbury mixer maintained at a temperature of 230° C. The calculated amount of the 2,4-di-n-buytlamino-6-hydroxy-s-triazine required was added to this slowly and mixed for five minutes. The weighed amount of acetylene black was then added in portions and mixed for two minutes after the last portion had been added. The mixture was then put through a roller mill at 230° F. to form thin slabs. These, after cooling, were put through a granulator. The granular material, after checking its nitrogen content by chemical analysis, was then ready for molding in an automatic injection-molding machine. The inner electrode and outer wall for the ionization chamber were molded separately in the automatic injection-molding machine. A method of evaluating the permeability of the conductive plastic composition to gases that was used involved a volumetric principle in which a constant pressure differential of from 1 to 10 atmospheres was imposed on a plastic film .003 to .010 inch thick at a constant temperature while the volume of the transmitted gas was determined in a calibrated capillary tube at virtually atmospheric pressure. The permeability constant used as a measure of the combined effects of solution and diffusion of a given gas within a plastic membrane was designated as follows: the permeability constant, P, is the number of cubic centimeters of gas at the measurement temperature passing through one square centimeter of film, one centimeter thick, per second, per centimeter of mercury pressure difference across the film. The permeability constant, P, is derived from the equation $q = PAt(P_1 - P_2)/d$, where $q$ represents the gas volume, A the area of the membrane, $t$ the time, $(P_1 - P_2)$ the pressure differential and $d$ the thickness of the membrane. The gases used for evaluation of the permeability constant were nitrogen and carbon dioxide. It was found that permeability values obtained with typical formulations were in the vicinity of $50 \times 10^{-12}$ cubic centimeters of nitrogen gas for a centimeter thick film per square centimeter area per second per centimeter mercury pressure. This value of permeability represents more than a twofold improvement on that of the polyethylene plastic itself.

2,4-di-n-butylamino-6-hydroxy-s-triazine may be prepared by treating an aqueous suspension of cyanuric chloride with an alkaline compound such as sodium hydroxide or sodium carbonate and thereby forming 2,4-dichloro-6-hydroxy-s-triazine. This material is then reacted with butylamine to form the 2,4-di-n-butylamino-6-hydroxy-s-triazine.

*Example 4*

One mole of cyanuric chloride, 184 grams, was added slowly with stirring to a molar solution of sodium hydroxide in water. Since this reaction is slightly exothermic the addition of cyanuric chloride must be made slowly and the reacting vessel is cooled to maintain the temperature below 10°. When one mole of sodium bicarbonate is used, the reaction temperature is maintained below 30° C. Sodium carbonate may also be used. The soluble 2,4-dichloro-6-hydroxy-s-triazine formed is filtered to remove any insoluble material present and reacted with an excess of butylamine, 4 moles of butylamine being reacted per mole of the 2,4-dichloro-6-hydroxy-s-triazine at a temperature between 90 and 100° C. for one hour. Two of the moles of the butylamine serve to replace the dichloro compound and 2 moles form the hydrochloride salt. The 2,4-di-n-butylamino-6-hydroxy-s-triazine formed is a light-colored solid which is readily filtered off while the butylamine hydrochloride remains soluble in water.

The 2,4-di-n-butylamino-6-chloro-s-triazine may be prepared by a direct treatment of cyanuric chloride with butylamine. The temperature of reaction is critical in that one chlorine atom on the cyanuric chloride molecule is readily removed at a temperature between 10 and 20° C., a second chlorine atom is removed at a temperature between 30 and 50° C., and as the reaction is allowed to proceed to 90° the third chlorine atom is then also substituted.

The following example shows a preferred method of preparing 2,4-di-n-butylamino-6-chloro-s-triazine.

*Example 5*

One mole of cyanuric chloride, 184 grams, is dissolved in acetone in the proportion of 25 grams of cyanuric chloride to 100 grams of solvent. This solution is then treated with 4 moles of butylamine at a temperature of approximately 60° C. for 30 minutes. A white solid is formed which is readily filtered off. The butylamine hydrochloride salt remains in solution. While the reaction may also be made to take place by treating a suspension of cyanuric chloride in water, we have found that an acetone solution of cyanuric chloride is a preferable starting material.

It will, of course, be apparent to organic chemists skilled in the art that minor variations in the synthesis of the two foregoing materials may be made without departing from the basic spirit of the invention.

While a tissue-equivalent composition has been set forth approximately corresponding to the nitrogen and hydrogen composition of animal tissue, increasing the relative proportions of the polyethylene or of the 2,4-di-n-butylamino-6-hydroxy-s-triazine will have the effect of increasing either the relative hydrogen or nitrogen percentage, respectively, present in the formulation. For special purposes, such variations may be desirable and of course may be readily obtained by decreasing or increasing these proportions.

While the primary purpose of this invention is directed toward the preparation of an animal tissue-equivalent conductive molding compound, it should be understood that this conductive compound may have uses other than as a tissue-equivalent plastic. In addition to its uses in other types of ionization chambers, depending upon the specific physical properties such as elasticity, structural strength, solubility and the like, compositions of this nature have a wide field of use in reducing accumulations of static electricity.

While we have described above the principles of our invention in connection with specific materials and processes, it is to be clearly understood that this description is made only by way of example and not as a limitation to the scope of our invention as set forth in the objects thereof and in the accompanying claim.

We claim:

A process for the production of 2,4-di-n-butylamino-6-hydroxy-s-triazine comprising reacting an aqueous suspension of cyanuric chloride with an alkaline compound at a temperature below 30° C. to form 2,4-dichloro-6-hydroxy-s-triazine and reacting said so-formed 2,4-dichloro-6-hydroxy-s-triazine with an excess of butylamine at a temperature between 90° C. and 100° C. to form 2,4-di-n-butylamino-6-hydroxy-s-triazine.

References Cited in the file of this patent

UNITED STATES PATENTS

| | | |
|---|---|---|
| 2,403,657 | Harvey | July 9, 1946 |
| 2,508,323 | Adams | May 16, 1950 |
| 2,543,801 | Patterson et al. | Mar. 6, 1951 |
| 2,565,194 | Bacon | Aug. 21, 1951 |
| 2,650,220 | Roemer et al. | Aug. 25, 1953 |
| 2,658,893 | Roemer et al. | Nov. 10, 1953 |

OTHER REFERENCES

Hofmann: Deutsche Chemische Gesellschaft (Bevichte), vol. 18, pp. 2767, 2770 and 2776 (1885).

Beilstein's Handbuch der Organischen Chemie (4th Ed.), 1937 ed., p. 245, System No. 3889.

Banks et al.: Jour. of the Amer. Chem. Soc., vol. 66, page 1771 (1944).

Thurston: J. Amer. Chem. Soc., vol 73, (1951), pp. 2981–2983.